Patented Nov. 19, 1946

2,411,396

UNITED STATES PATENT OFFICE 2,411,396

REACTION PRODUCTS OF FORMALDEHYDE AND SODIUM CYANAMIDE

Joseph Frederic Walker, Lewiston, N. Y., assignor to E. I. du Pont de Nemours & Company, Wilmington, Del., a corporation of Delaware No Drawing. Application October 21, 1943, Serial No. 507,182

9 Claims. (Cl. 260—69)

This invention relates to certain new and valuable products secured by reacting formaldehyde with sodium cynanamide. More particularly, it is concerned with the preparation of formaldehyde-sodium cyanamide condensation products by reacting the two chemical compounds in an aqueous solution, the temperature being maintained at room temperature or below, and the reaction being carried out under alkaline conditions.

It is therefore one of the objects of this invention to prepare novel condensation products by reacting formaldehyde and sodium cyanamide. Another object of this invention is to prepare these products, valuable as electroplating addition agents and for other purposes, by carrying out the reaction in a reaction medium which is substantially alkaline in reaction. These and still further objects of my invention will be apparent from the ensuing disclosure of certain preferred embodiments thereof.

I have now found that a condensation product of sodium cyanamide and formaldehyde can be obtained in fair yields by the addition of sodium cyanamide to fairly cold aqueous formaldehyde solutions, and that it may be isolated as a water-insoluble precipitate by neutralization of excess alkalinity in this solution. The reaction is carried out under alkaline conditions at a temperature below 35° C., preferably in the range 15° to 20° C. At the end of the reaction period the product may be precipitated by the addition of sufficient acid to reduce the high alkaline pH of the mixture to a value in the pH range 8 to 9.

The product is probably a partially hydrated polymer of methylene cyanamide ($CH_2=NCN$) in which approximately two-thirds of the CN radicals have been converted to amide groups. Analyses for carbon, hydrogen, and nitrogen indicate that its composition closely approximates the empirical formula, $C_6H_{10}N_6O_2$. The characteristics of the product are those of an amorphous resin, and it is probably not a simple compound of low molecular weight but rather a polymer or mixture of polymers made up of units corresponding to the $C_6H_{10}N_6O_2$ formula. It is believed that the structural formula of this polymer unit is as follows:

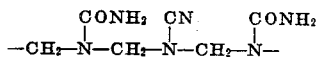

The new condensation product is a white, apparently non-crystalline solid which chars when heated to temperatures above 300° C. Although it is apparently stable when heated below 300° C. when dry, it undergoes further resinification when heated in the moist state and should be dried quickly and at relatively low temperatures to avoid undesirable alteration. On long heating in the moist state it combines with additional water and tends to liberate ammonia. A sample heated in this way was found to have an empirical composition corresponding to $C_6H_{12}N_6O_3$.

The new product dissolves readily in dilute aqueous acids or strong alkalis and is practically insoluble in water, the product being least soluble in aqueous liquids having a pH of 8.0-9.0. When dissolved in aqueous alkalies or acids it may be precipitated therefrom, although the yields upon reprecipitation are not entirely quantitative. Analyses of the reprecipitated product indicate that its composition is substantially unchanged.

In carrying out the reaction solid sodium cyanamide is preferably added to an aqueous solution of formaldehyde at a temperature somewhat below room temperature. The temperature will tend to increase during the reaction, and cooling will be necessary. The temperature of the reaction mixture should be maintained generally within the range of 15-20° C. although temperatures as elevated as 35° C. if maintained for only short periods of time are not objectionable. I have found a temperature as high as 25° C. maintained for some length of time not objectionable. When the acid added to precipitate the reaction product is added in successive portions, or when it is added in small increments over the entire reaction period, or over substantially the entire reaction period, it is not necessary to restrict the upper temperature limit so carefully during the latter stages of the process, and somewhat more elevated temperatures can be maintained without interference with the reaction. Ordinary commercial aqueous solutions of formaldehyde containing 37% of $CH_2O$ may be utilized directly, or they may be diluted to solutions of approximately 20% $CH_2O$ concentration or less before being utilized in the reaction.

When the reaction is carried out at approximately room temperature it is substantially complete at the end of about four to six hours. A mineral acid such as hydrochloric acid, sulfuric acid, phosphoric acid, or any other fairly strong acid, for example acetic acid, may then be added in amount sufficient to adjust the pH of the reaction mixture to one approximately within the range of 8.0-9.0. This causes the formaldehyde-sodium cyanamide condensation product to precipitate. If desired, the hydrochloric acid or other mineral acid may be added in successive small portions at various stages of the reaction following the addition of the sodium cyanamide to the formaldehyde, or it may be added more or less continuously in small incremental amounts during the entire reaction period. Under these conditions the reaction of sodium cyanamide and formaldehyde takes place concomitantly with the neutralization of the alkali. As previously stated, the addition of the mineral acid portionwise, or continuously during the reaction, also has the advantage of permitting the maintenance of temperatures somewhat above 25° C. during the latter stages of the process without interference with the reaction, thus simplifying the problem of cooling the reaction mixture.

The solution containing the precipitated condensation product may now be allowed to stand for two or more hours, or overnight, to insure complete precipitation. The filtered product may then be washed with water, dried, ground, and packed. I have secured very satisfactory drying with only slight discoloration, and with no caking, sintering or charring of the condensation product, by the use of a current of warm air at a temperature of 80 to 90° F. However, drum drying on a heated rotating drum has also given very satisfactory results. The dried product usually tends to have a reddish or brownish cast unless vacuum dried at room temperature.

The new condensation product is valuable as an addition agent in electroplating baths, and is also believed suitable for use as a flame-proofing agent, in the manufacture of heat-resistant resins, and in the case-hardening of ferrous metals.

As an example of my process for preparing the formaldehyde-sodium cyanamide condensation product, the following may be given:

Sodium cyanamide (technical grade approximately 94%) in the amount of 17.9 lbs. was reacted with 16.1 lbs. of commercial 37% formaldehyde solution. The solid sodium cyanamide was added to the formaldehyde solution, which was contained in a 15-gallon stoneware crock equipped with a stainless steel cooling coil and a stainless steel propeller agitator. Before the addition of the solid sodium cyanamide in granular form the formaldehyde was cooled to about 5° C. by the addition of ice to the solution. The granular sodium cyanamide was added gradually, in successive small increments, ice being added during the addition to keep the temperature below about 20° C. Following this, 23% hydrochloric acid was added continuously at a rate of about 12 lbs. per hour until the pH of the reaction mixture had fallen to a value in the range pH 8–9. Approximately 62.9 lbs. of 23% acid were required for this purpose. The temperature of the reaction mixture was maintained in the range 15 to 20° C. throughout this period, precipitation of product occurring during addition of the last half of the acid.

The precipitate was in a finely-divided form and was white or colorless. The reaction mixture was allowed to stand overnight before filtration in order to insure complete precipitation of the product. The condensation product was then filtered off, washed thoroughly with water and dried with hot air at a temperature of 80–100° F. This temperature was employed in the drying since at higher drying temperatures there is danger that the product may cake to form a brittle, dark red or reddish brown resin. Drum drying using a heated rotating drum on which the product remains for only a short period of time may be utilized without danger of objectional resinification. The dried product was of a granular character and of a light brown color.

The yield was approximately 65% of theory on the basis of the assumed reaction given below. This amounted to approximately one-half pound of product per pound of technical 94% sodium cyanamide used. Although I have not definitely established the chemical nature of my product, which is believed to be a mixture of polymers having the composition previously given, I believe that the reaction which takes place is as follows:

$$3Na_2CN_2 + 6HCl + 3CH_2O + 2H_2O = 1/n(C_6H_{10}N_6O_2)_n + 6NaCl + 3H_2O$$

This reaction evidently takes place in two stages: (1) condensation of sodium cyanamide and formaldehyde and (2) neutralization of alkali with resultant precipitation of finished product. Each stage of the reaction is exothermic.

Other suitable modifications and changes as will be obvious to a skilled chemist may be made in carrying out my process, without departing from the spirit or scope thereof. The scope of my invention is accordingly intended to include these variations and modifications, to the extent that they are comprehended within the scope of the appended claims.

I claim:

1. The process of preparing condensation products of sodium cyanamide and formaldehyde which comprises reacting, as the sole reactants, said compounds in substantially equimolar proportions in an aqueous alkaline reaction medium having a pH above 9 and approximately the pH of said aqueous solution of equimolecular proportions of sodium cyanamide and formaldehyde, the temperature during said reaction being maintained below about 25° C.

2. The process of preparing condensation products of sodium cyanamide and formaldehyde which comprises reacting, as the sole reactants, said compounds in substantially equimolar proportions, at a temperature not exceeding 35° C. in an aqueous alkaline reaction medium having a pH above 9 and approximately the pH of said aqueous solution of equimolecular proportions of sodium cyanamide and formaldehyde, and adding to said reaction a mineral acid in sufficient amount to adjust the pH of said reaction mixture to one within the range 8.0–9.0, thereby precipitating said condensation product.

3. The process of preparing condensation products of sodium cyanamide and formaldehyde which comprises reacting, as the sole reactants, said compounds in substantially equimolar proportions in an aqueous alkaline reaction medium having a pH above 9 and approximately the pH of said aqueous solution of equimolecular proportions of sodium cyanamide and formaldehyde, cooling said reaction medium during said reaction so that the temperature does not exceed 25° C., and adding a mineral acid in sufficient amount to insure a pH of said reaction medium within the range 8.0–9.0 at the conclusion of the reaction, whereby said condensation product is precipitated.

4. The process of preparing condensation products of sodium cyanamide and formaldehyde which comprises reacting, as the sole reactants, said compounds in substantially equimolar proportions, at a temperature not exceeding 35° C. in an aqueous alkaline reaction medium having pH above 9 and approximately the pH of said aqueous solution of equimolecular proportions of sodium cyanamide and formaldehyde, and adding hydrochloric acid thereto in amounts sufficient to insure a pH of said reaction medium within the range 8.0–9.0 at the conclusion of the reaction, whereby said condensation product is precipitated in said aqueous reaction medium.

5. The process of preparing condensation products of sodium cyanamide and formaldehyde which comprises reacting, as the sole reactants, said compounds in substantially equimolar proportions in an aqueous alkaline reaction medium having a pH above 9 and approximately the pH of said aqueous solution of equimolecular proportions of sodium cyanamide and formaldehyde, cooling said reaction medium during the reaction so that the temperature does not exceed about 5° C., and adding hydrochloric acid thereto in amounts sufficient to insure a pH within the range of 8.0–9.0 at the conclusion of the reaction, whereby the desired condensation product is precipitated in said reaction medium.

6. The process which comprises adding, in substantially equimolar proportion, solid sodium cyanamide to an aqueous solution of formaldehyde to form a reaction mixture in which said two substances are the sole reactants, maintaining the resulting reaction mixture at a temperature below about 25° C. and at a pH above 9 and approximately the pH of said aqueous solution of equimolecular proportions of sodium cyanamide and formaldehyde, adding thereto a mineral acid in amount sufficient to adjust the pH of the reaction mixture to one within the range 8.0–9.0, and recovering the precipitated condensation product from said reaction mixture.

7. The process which comprises adding, in substantially equimolar proportions, solid sodium cyanamide to an aqueous solution of formaldehyde to form a reaction mixture in which said two substances are the sole reactants, maintaining the temperature of the resulting reaction mixture below about 25° C. and at a pH above 9 and approximately the pH of said aqueous solution of equimolecular proportions of sodium cyanamide and formaldehyde, adding hydrochloric acid thereto in amount sufficient to adjust the pH of said reaction mixture to one within the range of 8.0–9.0, and recovering the precipitated sodium cyanamide-formaldehyde condensation product from said reaction mixture.

8. The condensation product of sodium cyanamide and formaldehyde obtained by the process of claim 1 having the empirical formula $C_6H_{10}N_6O_2$, said product being a white, apparently non-crystalline solid, practically insoluble in water, but readily soluble in aqueous alkalies and acids.

9. The product prepared by reacting sodium cyanamide and formaldehyde in an aqueous alkaline reaction medium in accordance with the process of claim 2, and adding a mineral acid to said reaction medium in amount sufficient to precipitate said product in said reaction medium.

JOSEPH FREDERIC WALKER.